April 25, 1967 E. J. VANESSE, JR 3,315,915
AUTOMOBILE SAFETY BELT
Filed Oct. 27, 1964

INVENTOR
EUGENE J. VANESSE, Jr

BY Joseph K. Schofield
ATTORNEY

United States Patent Office
3,315,915
Patented Apr. 25, 1967
~~~

3,315,915
AUTOMOBILE SAFETY BELT
Eugene J. Vanesse, Jr., Litchfield, Conn., assignor to Defco Incorporated, Litchfield, Conn., a corporation of Connecticut
Filed Oct. 27, 1964, Ser. No. 406,733
4 Claims. (Cl. 242—107.4)

This invention relates to safety belts for use in automobiles and more particularly to means to stop further outward movement of the belt when rapidly withdrawn from its arbor and to provide manual means to permit release of the belt from its locked condition so that the belt may again be withdrawn freely.

This application describes and claims an improvement in the safety belt construction disclosed in the application of Henry J. Gill, Ser. No. 211,915, filed July 23, 1962 now Patent No. 3,214,218 granted Oct. 26, 1965.

In addition to the mechanism shown in the above referred to patent for controlling the outward or engaging movement of the pawl rotating with the spindle or arbor over which the belt is wrapped to lock the belt against further outward movement, means are provided to manually move the locking pawl inwardly to be disengaged from one of the teeth formed in an internal ratchet gear secured in fixed position to the housing for the arbor and belt.

In order to move the pawl inward to disengage its outer end from the teeth of the internal ratchet gear to free the arbor and belt from their locked condition, a series of arcuate members are arranged concentrically in front of and surrounding the end of the arbor. These arcuate members are pivotally mounted at one of their ends to the housing and adapted for simultaneous arcuate movement to reduce the central opening within them.

With the above and other objects in view, the invention includes the features of construction and operation set forth in the following specification and illustrated in the accompanying drawing.

In the accompanying drawing annexed hereto and forming a part of this specification, I have shown the invention embodied in a conventional or standard form of safety belt for automobiles, but it will be understood that the invention can be otherwise embodied and that the drawing is not to be construed as defining or limiting the scope of the invention, the claims appended to this specification being relied upon for that purpose.

In the above mentioned drawing, there has been shown but one embodiment of the invention which is now deemed preferable, but it is to be understood that changes and modifications may be made within the scope of the appended claims without departing from the spirit of the invention.

Figure 1:
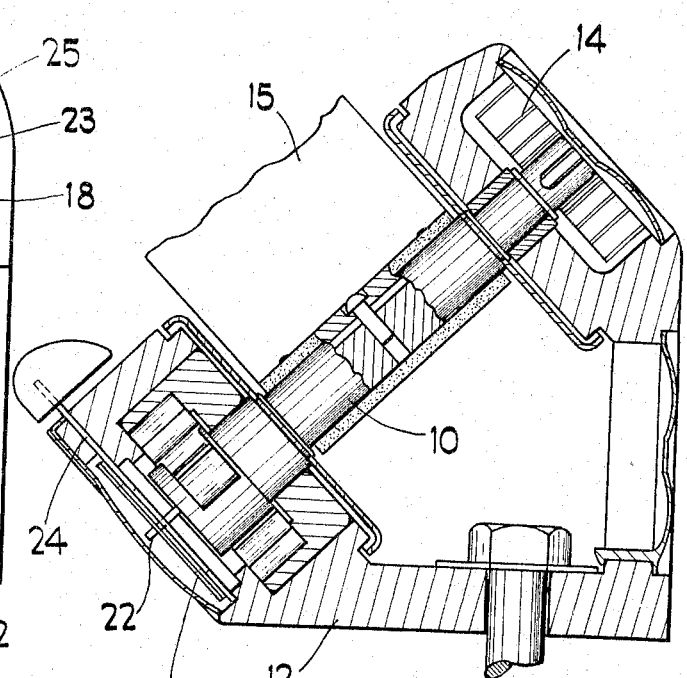
FIG. 1 is a side elevation, partly in section, showing a belt supporting unit made in accordance with the present invention.

Referring more in detail to the figures of the drawing, and first to FIG. 1, it will be seen that an arbor 10 is mounted for rotation on an oblique axis within a fixed housing or head 12. At one end of this arbor 10 is a coiled spring 14, one end of which is attached to the arbor 10 and the opposite end to a part of a head 12. Around the intermediate part of the arbor 10 is wrapped a belt 15, one end of which is made fast to the arbor. Withdrawing the belt 15 from the arbor 10 winds the spring 14 and serves to rewind the belt about the arbor when the belt 15 is released.

At the opposite end of the arbor 10 is a pawl 16 pivotally attached thereto for movement radially outward for engagement with the teeth of a ratchet gear 18. This gear 18 as shown is fastened within the housing or head and is concentric with the arbor so that any tooth may be engaged by the pawl 16 when the pawl 16 is moved to its outward position.

A light spring 20 presently to be more fully described normally forces the pawl 16 toward its inward position in which position the pawl is disengaged from the teeth of the ratchet gear 18. Rapid withdrawal of the belt 15 and consequent rapid rotation of the arbor 10 due to centrifugal force causes the pawl 16 to move outwardly against the pressure of its spring 20 and engage the outer end of the pawl with one of the teeth of the ratchet gear 18.

The above description outlines the construction and operation of the safety belt described and claimed in the above identified patent.

Figure 2:
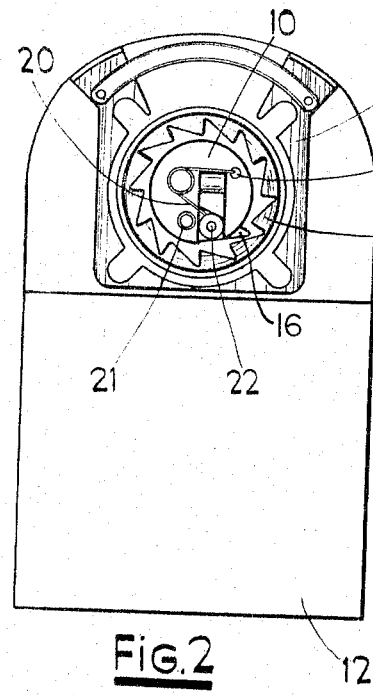
FIG. 2 is an end view of the unit shown in FIG. 1, the view being taken looking in the direction of the belt arbor axis.
Figure 3:
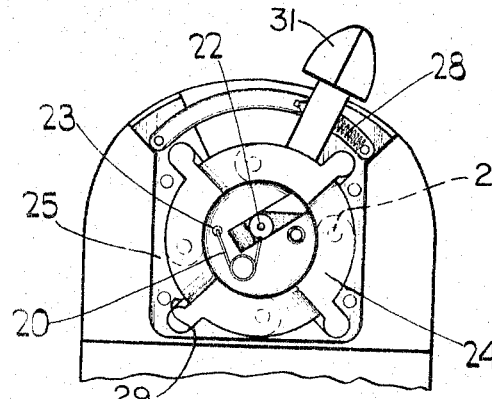
FIG. 3 is a front end view of the belt arbor showing the pivotally mounted arcuate members for withdrawing the pawl from engagement with the teeth of the ratchet gear, the arcuate members being shown in their open position.

In the present application the light spring 20 referred to above has one end attached to an end face of the belt supporting arbor 10 as shown at 23 and the opposite end is secured to the outer face of the pawl as shown in FIGS. 2 and 3. Normally this spring 20 retains the pawl 16 in its inner or disengaged position. However, rapid withdrawal movement of the belt 15 rapidly rotates the belt arbor 10 so that centrifugal force overcomes the force of the spring 20 and permits outward movement of the pawl 16 about its pivot 21. This outward pivotal movement engages the pawl 16 with a tooth of an internal ratchet gear 18 secured within the unit housing 12 concentrically of the belt arbor 10.

Figure 6:
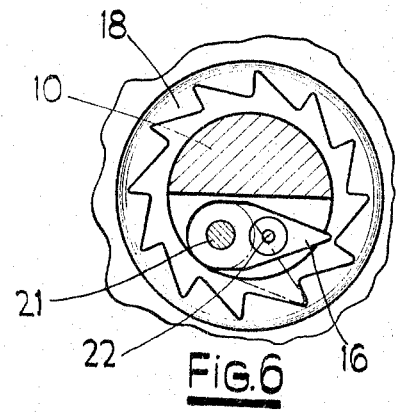
FIG. 6 is a sectional view of the pawl end of the belt arbor, the section being taken on the plane of line 6—6 in FIG. 5.
Figure 5:
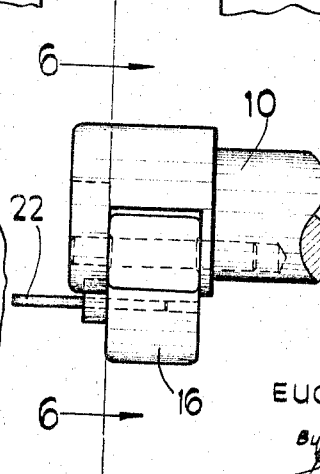
FIG. 5 is a side view of the pawl end of the belt supporting arbor showing the locking pawl in an extreme outwardly moved position.

To release the pawl 16 from engagement with the ratchet gear 18, a small rod 22 is provided extending forwardly from the front face of the pawl 16 as shown in FIGS. 5 and 6.

Figure 4:
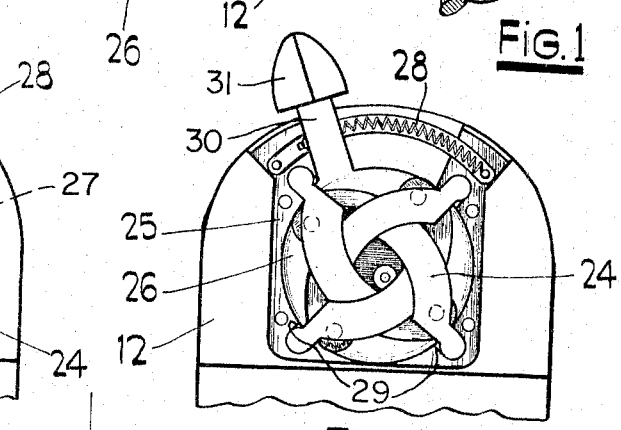
FIG. 4 is a view similar to FIG. 3 and showing the pivotally mounted members in their innermost position to release the pawl from engagement with the ratchet gear.

Mounted within the front face of the unit and disposed concentrically to the belt arbor 10 are four arcuate members 24. Preferably these arcuate members 24 are as shown pivotally mounted as shown at 27 within a plate member 26 inset within the front face of the housing, and the plate member 26 is mounted for oscillatory movement about the axis of arbor 10. Each of these arcuate members 24 at one end is pivotally mounted at 27 to the rotatably mounted member 26 housed in a recess 29 formed in the front surface of the unit housing 12. The opposite end of each arcuate member 24 extends outwardly and fits within a small recess just outside the recess 29 within which fits the rotatable member 26. The arcuate members 24, therefore, oscillate about these ends pivoted to member 26. Angular movement of this rotatably mounted member 26 serves to simultaneously swing the arcuate members 24 inwardly so that the central opening formed within them is greatly reduced as shown in FIG. 4.

The rod 22 outstanding from the front face of the pawl 16 extends to the plane of the arcuate members 24. Movement therefore of the arcuate members 24 by angular movement of member 26 by engagement with the rod 22 forces the rod 22 and pawl 16 to an inner and disengaged position relative to the ratchet wheel 18. Releasing the angularly movable plate 26 permits the arcuate members 24 to return to their outer positions. In this outer position of the arcuate members 24 the pawl 16 is again free to move outward to its ratchet gear engaging position. For normally retaining the rotatable member 26 in the position holding the arcuate members 24 in their outer positions, a small spring 28 is provided, one end of which is attached to the angularly movable plate 26 and the other is fastened to the housing. To manually rotate the member 26 to disengage the pawl 16, an extension 30 is provided preferably as shown having a small knob 31 at its outer end.

In operation the belt 15 may be unwound freely but slowly from its arbor 10 and adjusted about the wearer as in the above referred to patent. The withdrawal movement during this adjustment is not rapid enough to cause outward radial movement of the pawl 16 to engage a tooth of the ratchet gear 18 and stop further withdrawal of the belt. As soon, however, as the belt 15 is rapidly withdrawn, centrifugal force overcomes the pressure of spring 20 and forces the pawl 16 outward into engagement with a tooth of ratchet gear 18. Further outward movement of the belt is therefore promptly stopped. To release the pawl 16 from engagement with gear 18, the plate 26 is oscillated to move the arcuate members 24 to their closed position. This moves the rod 22 on the pawl 16 by its engagement with one of the arcuate members 24. This movement of rod 22 is inward and releases the pawl. Movement of plate 26 in the direction to release the pawl 16 extends spring 28 which promptly, when the plate 26 is released, returns the plate 26 to its initial position, in which the arcuate members 24 are in their open position.

I claim:
1. A safety belt for automobiles comprising a housing,
an arbor mounted for rotation therein,
a belt wrapped about said arbor,
a spring normally retaining said belt in retracted position,
a pawl pivotally mounted on said arbor,
a rod extending forwardly from said pawl,
a light spring normally forcing said pawl toward its inner position,
an internal ratchet gear concentrically surrounding said arbor and in position for engagement of its teeth by said pawl when moved outward against the pressure of said spring,
and pivotally mounted members radially movable and manually operable to positions against said rod to move said pawl from its gear engaging outer position to its inner disengaged position.

2. A safety belt for automobiles comprising a housing,
an arbor mounted for rotation therein,
a belt wrapped about said arbor,
a spring normally retaining said belt in retracted position,
a pawl mounted on said arbor and movable radially outward thereof,
a light spring normally forcing said pawl toward its inner position,
an internal ratchet gear concentrically surrounding said arbor and in position for engagement of its teeth by said pawl when moved outward against the pressure of said spring,
and pivotally mounted members within said housing simultaneously radially movable to move said pawl from its engaged outer position to its inner disengaged position, and manually operable means to move said pivotally mounted members to move said pawl to its inner disengaged position.

3. A safety belt for automobiles comprising a housing,
an arbor mounted for rotation therein,
a belt wrapped about said arbor,
a spring normally retaining said belt in retracted position,
a pawl pivotally mounted on said arbor,
a spring normally forcing said pawl toward its inner position,
an internal ratchet gear concentrically surrounding said arbor and in position for engagement of its teeth by said pawl, and
a plurality of pivotally mounted arcuate members within said housing concentric with said arbor simultaneously movable inward to move said pawl from its engaged outer position to its inner disengaged position, and manually operable means to move said pivotally mounted members to move said pawl to its inner disengaged position.

4. A safety belt for automobiles comprising
a housing,
an arbor mounted for rotation therein,
a belt wrapped about said arbor,
a spring normally retaining said belt in retracted position,
a pawl pivotally mounted on said arbor for radial movement,
a spring normally forcing said pawl toward its inner position,
an internal ratchet gear within said housing concentrically mounted relative to said arbor and in position for engagement of its teeth by said pawl,
an oscillating plate within said housing surrounding one end of said arbor,
a series of pivotally mounted arcuate members on said plate disposed concentrically of the arbor,
a member extending from said pawl adapted for engagement with said arcuate members,
and manual means to simultaneously move said arcuate members to a closed position to engage said member extending from said pawl and move said pawl to its inner disengaged position.

References Cited by the Examiner

UNITED STATES PATENTS

| | | | |
|---|---|---|---|
| 1,994,657 | 3/1935 | Lindeman | 188—82.3 |
| 2,105,469 | 1/1938 | Bosch | 242—107.7 |
| 2,708,555 | 5/1955 | Heinemann et al. | 242—107.4 |
| 2,990,131 | 6/1961 | Carlsson | 242—107.4 |
| 3,058,687 | 10/1962 | Bentley | 242—107.4 |
| 3,077,324 | 2/1963 | Strickland | 242—107 |
| 3,206,137 | 9/1965 | Snyderman | 242—107.4 |
| 3,214,218 | 10/1965 | Gill | 242—107.4 X |

STANLEY N. GILREATH, *Primary Examiner.*

W. S. BURDEN, *Assistant Examiner.*